H. J. NINMAN.
FARM PICK.
APPLICATION FILED APR. 21, 1920.
1,369,835.
Patented Mar. 1, 1921.
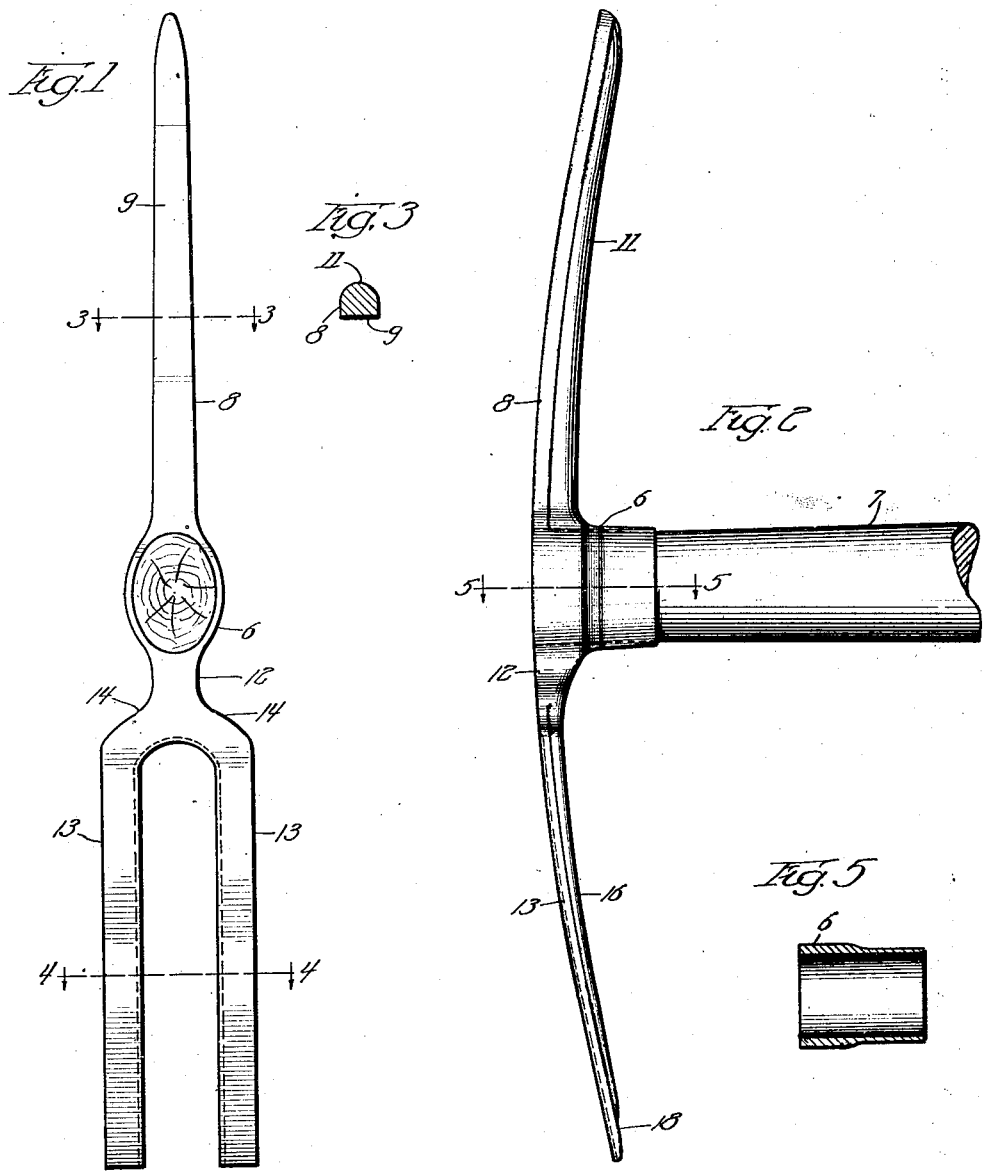
Inventor
Herman J. Ninman
By
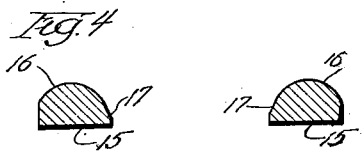
Attys

UNITED STATES PATENT OFFICE.

HERMAN J. NINMAN, OF MADISON, WISCONSIN.

FARM-PICK.

1,369,835. Specification of Letters Patent. Patented Mar. 1, 1921.

Application filed April 21, 1920. Serial No. 375,454.

*To all whom it may concern:*

Be it known that I, HERMAN J. NINMAN, a citizen of the United States, residing at Madison, in the county of Dane and State of Wisconsin, have invented certain new and useful Improvements in Farm-Picks, of which the following is a specification.

This invention relates in general to tools or implements, and has more particular reference to a tool which I have designated as a farm pick, and which is particularly designed for use by farmers, gardeners, horticulturists and others for loosening the soil, baring and removing the roots of plants or shrubs to be transplanted without injury to the roots, and for baring and removing the roots of noxious plants which, for their elimination, require the complete removal of the roots. While the pick embodying my invention is particularly suitable for purposes similar to those above indicated, it is also adapted for many other uses by farmers and others, which it will be unnecessary to enumerate.

One of the primary objects of my present invention is to produce a farm pick, which will be strong and durable and adapted for prying purposes as well as digging, one which will be light and well balanced, one which will not injure the roots of the plants or shrubs around which it is being used, one which can be moved easily through the soil without clogging up in wet sticky soil, and one which shall be so constructed that the handle may be readily removed so that the tool can be carried in knocked down condition, and which can be quickly re-assembled when desired.

Other objects and many of the inherent advantages of my invention should be readily appreciated by those skilled in the art, as the same becomes better understood, by reference to the following description when considered in connection with the accompanying drawings.

Referring to the drawings:

Figure 1 is a front view of a pick embodying my invention;

Fig. 2 is a side view thereof;

Fig. 3 is a transverse sectional view on the line 3—3 of Fig. 1;

Fig. 4 is a similar view on the line 4—4 of Fig. 1; and

Fig. 5 is a similar view on the line 5—5 of Fig. 2.

By reference to the drawings, it will be observed that the pick comprises primarily, a centrally disposed head 6, providing an elongated socket adapted to receive the handle 7. That face of the pick disclosed in Fig. 1 will be referred to as the front, and from this figure it will be observed that the socket is elliptical in shape and tapers from the front to the rear, as will be evident from Figs. 2 and 5. The handle is so shaped that it may be inserted through the socket from the left, viewing Fig. 2 and when fully inserted, its outer end will snugly fit in the socket and will prevent the head from slipping off the end of the handle while at the same time, the socket is of such length that the handle is gripped thereby to prevent the head from slipping toward the hands of the user when the pick is being manipulated.

At one side of the head, a single prong 8 formed integrally with the head, projects therefrom in the plane of the major transverse axis of the socket. This prong is curved longitudinally outwardly from the head about three-fourths of the length of the prong and from the end of the curvature, the prong extends in a substantially straight line to its tip. The front face 9 of the prong is flat, as shown in Figs. 1 and 2, while the rear face 11 is curved transversely. The prong is thus shaped so that the front face will present a considerable area to facilitate prying operations with the prong, while the rear face presents only curved surfaces, which will not cut or injure the roots of the plant or shrub with which it comes in contact. To facilitate entrance of the prong into the soil, the tip thereof is tapered from both sides as well as from the rear, as will be apparent from Figs. 1 and 2.

At the opposite side of the head 6 from the prong 8 there is provided a neck 12, also formed integrally with the head and projecting a limited distance from the head in a diametrically opposite direction from the prong 8. A short distance from the head the neck 12 is bifurcated to provide a pair of substantially parallel prongs 13, spaced apart throughout their length and united to the neck by shoulders 14.

The front faces 15 of these prongs 13 are flat, as indicated in Figs. 1 and 4, to present substantial areas for prying purposes similarly to the prong 8, and the rear surfaces are curved, as indicated at 16 to avoid injury to the roots of the plants with which the pick is brought in contact while in use. In order to facilitate movement of the prongs 13 through the soil and to prevent clogging in wet, sticky soil, the inner edges are beveled off from front to rear, as indicated by reference character 17, so that the front edges of the prongs are closer together than the rear edges thereof. To facilitate entrance of the prongs into the soil, the rear faces are tapered toward the ends, as indicated at 18, the tips, however, being left rather blunt as the tool is not intended for cutting purposes. Like the prong 8, the prongs 13, of which the neck 12 forms in effect a continuation, are curved longitudinally from the head 6 to a point substantially three-quarters of their length to their head, from which the prongs extend in a substantially straight line.

It will be obvious from Fig. 2 that the prong 8 is of gradually increasing thickness from front to rear from the tip toward the head, as are also the prongs 13, the maximum thickness being found in the neck 12 as it approaches the head. The purpose of tapering the prongs in this manner is to provide the maximum of strength where it is most required, which, when the tool is used for prying or other purposes is, of course, near the head. The prong 8 is preferably somewhat thicker from front to rear throughout its length than the prongs 13, as the single prong is designed for heavier work, while the prongs 13 are employed in lighter uses.

It will be manifest from the foregoing that I have provided a pick which is strong and durable and yet light, which provides a single prong of requisite strength adapted for prying and loosening purposes, which has a flat front face and a curved rear face so as to avoid injury to roots, and that the double prongs likewise have flat front faces and curved rear faces for similar purposes, and are united to a head in a strong substantial manner so as to provide a tool of minimum weight for the strength required. It is believed that the construction and many of the inherent advantages of my invention will be understood from the foregoing without further description, but it should be manifest that the size, shape and proportion of the various parts may be varied within considerable limits, without departing from the essence of the invention as defined in the appended claim.

I claim:

A farm pick, comprising a central head provided with a handle receiving socket of substantial depth tapered from front to rear, a prong projecting from one side of said head, a neck projecting from the opposite side of said head and bifurcated a short distance from the head to provide a pair of prongs arranged in spaced relation throughout their length, all of said prongs being shaped to present transversely flat front faces, transversely curved rear faces and blunt ends.

HERMAN J. NINMAN.